United States Patent
Kim et al.

(10) Patent No.: US 8,031,438 B2
(45) Date of Patent: Oct. 4, 2011

(54) ACTUATOR LATCH SYSTEM OF HARD DISK DRIVE

(75) Inventors: Kyung-ho Kim, Seoul (KR); Min-pyo Hong, Suwon-si (KR); Yong-jae Kim, Seoul (KR); Yu-sung Kim, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 403 days.

(21) Appl. No.: 12/391,320

(22) Filed: Feb. 24, 2009

(65) Prior Publication Data

US 2009/0213500 A1 Aug. 27, 2009

(30) Foreign Application Priority Data

Feb. 25, 2008 (KR) .................. 10-2008-0016983

(51) Int. Cl.
*G11B 5/54* (2006.01)

(52) U.S. Cl. .............. 360/256.2; 360/256; 360/256.3; 360/256.4

(58) Field of Classification Search .......... 360/256.2, 360/256.3, 256.4
See application file for complete search history.

(56) References Cited

U.S. PATENT DOCUMENTS

| 7,050,269 B2 * | 5/2006 | Hong et al. ............. 360/256 |
| 7,203,019 B1 | 4/2007 | Liu et al. |
| 7,564,654 B2 * | 7/2009 | Kim et al. .............. 360/256.4 |
| 7,715,149 B1 * | 5/2010 | Liebman et al. ........ 360/256.2 |

FOREIGN PATENT DOCUMENTS

| JP | 2003-068038 | 3/2003 |
| JP | 2005-044475 | 2/2005 |
| JP | 2006-048768 | 2/2006 |

* cited by examiner

*Primary Examiner* — Tan T. Nguyen
(74) *Attorney, Agent, or Firm* — Volentine & Whitt, PLLC

(57) ABSTRACT

An actuator latch system of a hard disk drive selectively locks in place and releases a rotatable swing arm having a front end portion supporting a magnetic head and a rear end portion on which a voice coil motor (VCM) coil is disposed. The actuator latch system includes a notch in the rear end portion of the swing arm, and a rotatable latch lever having a front end portion including a hook and a magnet. The hook is received in the notch in the rear end portion of the swing arm to arrest rotation of the swing arm in a predetermined direction. The magnet of the latch lever faces a section of the VCM coil such that when the hard disk drive is started, the latch lever is rotated by a force generated due to current flowing through the section of the VCM coil faced by the magnet and the magnetic field generated by the magnet. The rotation of the latch lever prevents the hook from interfering with the rotation of the swing arm in the predetermined direction.

16 Claims, 8 Drawing Sheets

ACTUATOR LATCH SYSTEM OF HARD DISK DRIVE

BACKGROUND OF THE INVENTION

1. Field of the Invention

The present invention relates to a hard disk drive. More particularly, the present invention relates to an actuator latch system of a hard disk drive, which locks an actuator of the hard disk drive in place when the disk of the hard disk drive is not rotating.

2. Description of the Art

Hard disk drives (HDD) are used in electronic devices such as computers to reproduce data from a disk or record data onto the disk. More specifically, in addition to such a disk, an HDD includes a magnetic (read/write) head, an actuator for moving the magnetic head over a desired location (track) of the disk, and a spindle motor for rotating the disk. The magnetic head is floated a predetermined height from the recording surface of the disk while the disk is rotated, and detects/modifies the magnetization of the recording surface of the disk to reproduce/record data from/onto the disk.

In addition, when the HDD is not in use, that is, when the disk is not rotating, the magnetic head is parked off of the recording surface of the disk. Systems for parking the magnetic head of the HDD include a contact start stop (CSS) type of parking system and a ramp type of parking system. In the CSS type of parking system, an inner circumferential portion of the disk devoid of recorded data is reserved as a parking zone, and the magnetic head is held against the parking zone of the disk when the magnetic head is parked. In the ramp type of parking system, a ramp is disposed radially outwardly of the disk, and the magnetic head is held against the ramp when the magnetic head is parked.

However, an HDD can be subjected to external shock or vibrations when the HDD is not in use. Such external shock or vibrations have the potential to move the magnetic head out of the parking zone or off of the ramp and onto the recording surface of the disk. If this were allowed to happen, the magnetic head or the recording surface of the disk could be damaged. Therefore, the actuator needs to be locked in place when the magnetic head is parked. To this end, HDDs include various kinds of actuator latch systems.

FIGS. 1A, 1B, and 1C illustrate a conventional latch system of an HDD for locking the actuator of the HDD in place when the magnetic head is parked.

Referring to FIG. 1A, the actuator 10 of the HDD includes a swing arm 12 that is rotatably supported by a pivot 11, a suspension 13 disposed on an end portion of the swing arm 12, and a slider 14 supported by the suspension 13. The head slider 14 contains the magnetic head. The suspension biases the head slider 14 and hence, the magnetic head, toward a (recording) surface of the disk during a read/write operation in which the magnetic head is recording data onto the disk or reading data from the disk.

In addition, the HDD includes a single lever inertial latch system 20 for locking the actuator 10 in place when the magnetic head is parked on ramp 15. The inertial latch system 20 includes a latch lever 21 supported so as to be freely rotatable, a latch hook 22 integral with the latch lever 21, a notch 23 in the swing arm 12 of the actuator 10, a crash stop 24 that limits the rotation of the swing arm 12 in a clockwise direction, and a latch stop 25 that limits the rotation of latch lever 21 in the clockwise direction.

As shown in FIG. 1B, when shock applied to the HDD causes the swing arm 12 of the actuator 10 and the latch lever 21 to rotate counter-clockwise due to inertia, the latch hook 22 is received in the notch 23 such that the rotation of the swing arm 12 of the actuator 10 is arrested. On the other hand, as shown in FIG. 1C, when shock applied to the HDD causes the swing arm 12 of the actuator 10 and the latch lever 21 to rotate clockwise due to inertia, the swing arm 12 collides with the crash stop 24, and then rebounds from the crash stop 24 and thus rotates counter-clockwise. At the same time, the latch lever 21 rebounds from the latch stop 25 and thus rotates counter-clockwise. In this case, the latch hook 22 can be received in the notch 23 to arrest the further rotation of the actuator 10 in the counter-clockwise direction. However, the conventional single lever inertial latch system 20 is unreliable.

In the case in which the shock applied to the HDD causes the swing arm 12 to initially rotate counter-clockwise, the rotation of the swing arm 12 is indeed arrested by the latch lever 21 as described above. However, the impulse generated by the engagement between the swing arm 12 and the latch hook 22 causes the latch lever 21 and the swing arm 12 to spring back. Thus, the swing arm 12 rotates clockwise. The swing arm 12 collides with the crash stop 24, rebounds, and then again rotates counter-clockwise. In this case, though, the rotation of the swing arm 12 and the rotation of the latch lever 21 are poorly timed. As a result, the swing arm 12 is not hooked by the latch hook 22. Therefore, the swing arm 12 continues to rotate counter-clockwise such that the magnetic head moves off of the ramp 15 and onto the recording surface of the disk. Accordingly, the magnetic head or the recording surface of the disk can be damaged.

FIGS. 2A, 2B, and 2C show a dual-lever inertial latch system 40 that is designed to obviate the above-described problem of the single lever inertial latch system.

Referring to FIG. 2A, the dual-lever inertial latch system 40 includes first and second latch levers 41 and 42 that are supported so as to be freely rotatable, a latch pin 43 integral with the first latch lever 41, a latch hook 44 integral with the second latch lever 42, a notch 45 in a swing arm 32 of the actuator 30, and a crash stop 46 limiting the rotation of the swing arm 32 in the clockwise direction.

As shown in FIG. 2B, when shock applied to the HDD causes the swing arm 32 of the actuator 30 and the first and second latch levers 41 and 42 to rotate counter-clockwise due to inertia, the latch hook 44 is received in the notch 45 in the swing arm 32. Thus, the swing arm 32 of the actuator 30 cannot rotate further. On the other hand, as shown in FIG. 2C, when shock applied to the HDD causes the swing arm 32 of the actuator 30 and the first latch lever 41 to rotate clockwise due to inertia, the swing arm 32 initially rotates clockwise, then collides with the crash stop 46, rebounds from the crash stop 46, and thus rotates counter-clockwise. In addition, the first latch lever 41 rotates clockwise, and the latch pin 43 engages the second latch lever 42 to make the second latch lever 42 rotate in the counter-clockwise direction. Accordingly, the latch hook 44 of the second latch lever 42 is received in the notch 45 and thus, the rotation of the swing arm 32 in the counter-clockwise direction is arrested.

The conventional dual-lever inertial latch system 40 operates reliably regardless of the direction in which shock is applied to the HDD. However, two latch levers 41 and 42 are required. That is, the structure of the dual lever latch system 40 is complex and bulky. Accordingly, the dual-lever inertial latch system 40 is expensive. Also, it is difficult to incorporate the dual-lever inertial latch system into a small disk drive such as those used in mobile devices.

Finally, the distance between the notch and the latch hook of a conventional latch system has been minimized in an attempt to improve the reliability of the latch system. However, minimizing this distance increases the likelihood that the latch lever will hook onto the swing arm of the actuator when a read/write operation of the HDD is initiated and the swing arm is rotated counterclockwise. Thus, the magnetic head will remain parked and the HDD will not operate properly.

SUMMARY OF THE INVENTION

An object of the present invention is to provide an actuator latch system of a hard disk drive, which operates properly and reliably.

According to an aspect of the present invention, there is provided an actuator latch system of a hard disk drive for selectively locking in place and releasing a swing arm of the hard disk drive, wherein a latch lever of the actuator latch system has a front end portion including both a hook and a magnet.

The swing arm of the hard disk drive is rotated by a voice coil motor (VCM) having a VCM coil disposed on a rear end portion of the swing arm and at least one permanent magnet fixed relative to and juxtaposed with the VCM coil in the direction of the axis of rotation of the swing arm. The swing arm has a notch in a rear end portion thereof, and the hook is moved into and out of the notch to respectively lock the swing arm in place (when the magnetic head is parked) and to release the swing arm (when the hard disk drive is started). A section of the VCM coil extends alongside the magnet of the latch lever when the swing arm is in a position at which the magnetic head is parked and the latch lever is in a position locking the swing arm in place. When the hard disk drive is started, the magnetic field of the magnet of the latch lever and current flowing through the section of the VCM coil facing the magnet of the latch lever interact to rotate the latch lever and thereby move the hook of the latch lever away from the rear end portion of the swing arm. As a result, the latch lever does not interfere with the rotation of the swing arm.

Also, the section VCM coil that is faced by the magnet of the latch lever, and the poles of the magnet of the latch lever are oriented relative to each other such a thrust generated on the swing arm due to the interaction between the magnetic field and current flowing through the VCM coil acts on the swing arm in a direction that substantially intersects the axis of rotation of the swing arm. Accordingly, the thrust produces little, if any moment about the axis of rotation of the swing arm and hence, the swing arm is not rotated.

The section of the VCM coil which cooperates with the magnet of the latch lever may be a laterally offset section of the coil. In particular, the laterally offset section of the coil is disposed radially outwardly of the at least one magnet of the VCM in a direction perpendicular to the axis of rotation of the swing arm.

The magnet of the latch lever may be a permanent magnet. The latch lever may also have an iron member lying along a surface of the permanent magnet. In this case, the permanent magnet faces a section of the VCM coil, and the iron member is disposed on a surface of the permanent magnet which is opposite to the surface of the permanent magnet facing the VCM coil.

Furthermore, the front end portion of the latch lever may extend over a section of the VCM coil so as to face the top of that section of the VCM coil when the swing arm is in its position at which the magnetic head is parked and the latch lever is in its position locking the swing arm in place. The hook may protrude downwardly at the front end portion of the latch lever. That is, the hook may extend downwardly into the notch when the swing arm is in its position at which the magnetic head is parked and the latch lever is in its position locking the swing arm in place.

The latch lever may also have a counterbalance at a rear end portion of the latch lever disposed on an opposite side of the axis of rotation of the latch lever from the hook. A magnetic core may be mounted to the counterbalance. In this case, the magnetic core is positioned on the counterbalance so as to located closer to the at least one magnet of the VCM when the latch lever is in an unlatched position than when the latch lever is in its latched position. Therefore, the at least one permanent magnet of the VCM exerts a relatively strong magnetic force of attraction on the iron core when the latch lever is in its unlatched position to ensure that the latch lever remains in its unlatched position while the hard disk drive is operating (carrying out a read/write operation).

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE PREFERRED EMBODIMENTS

Figure 1A:
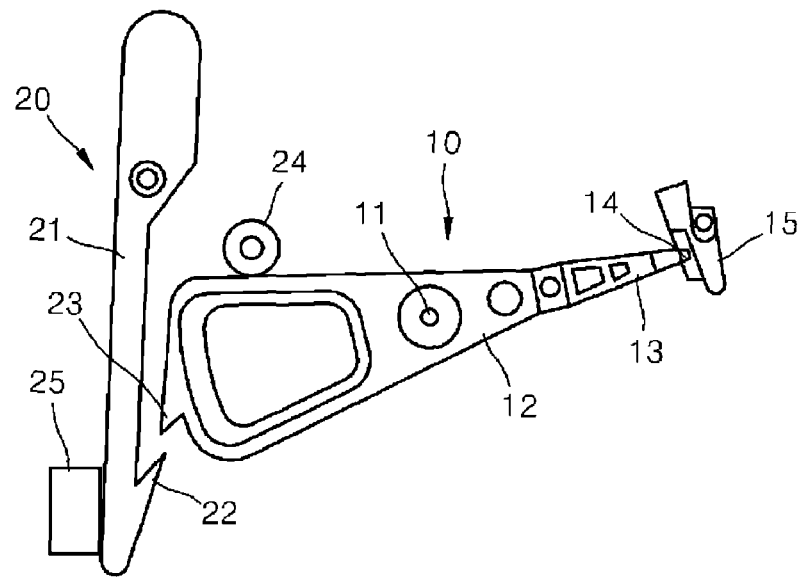
FIGS. 1A, 1B, and 1C are each a plan of a conventional single lever inertial latch system of a hard disk drive (HDD), and together illustrate the operation of the latch system.
Figure 1B:
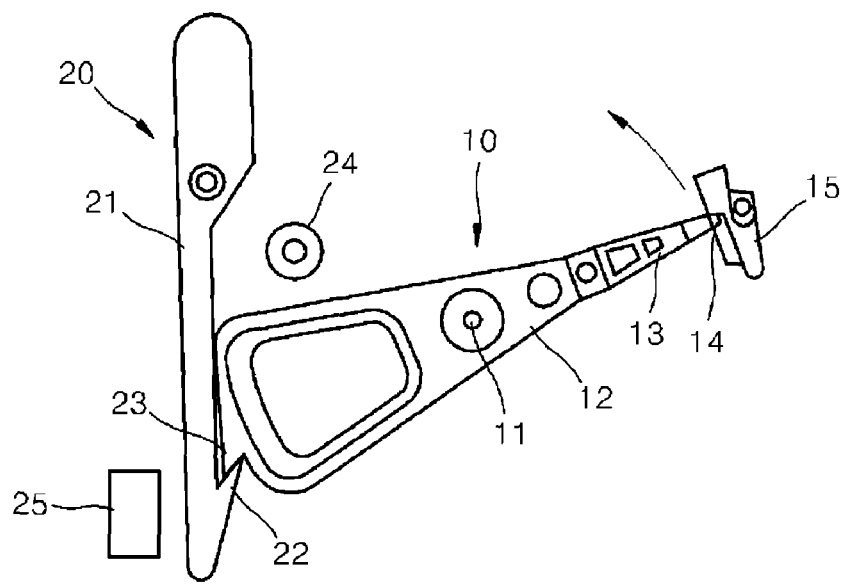
Figure 1C:
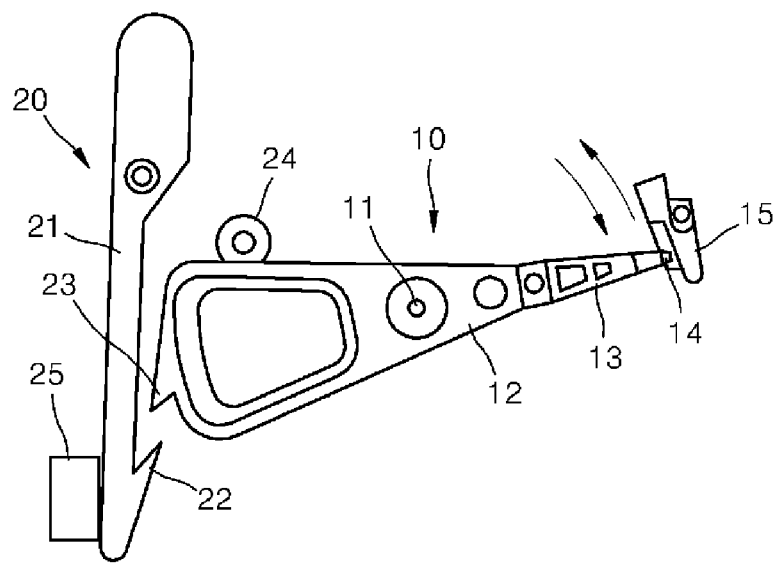
Figure 2A:
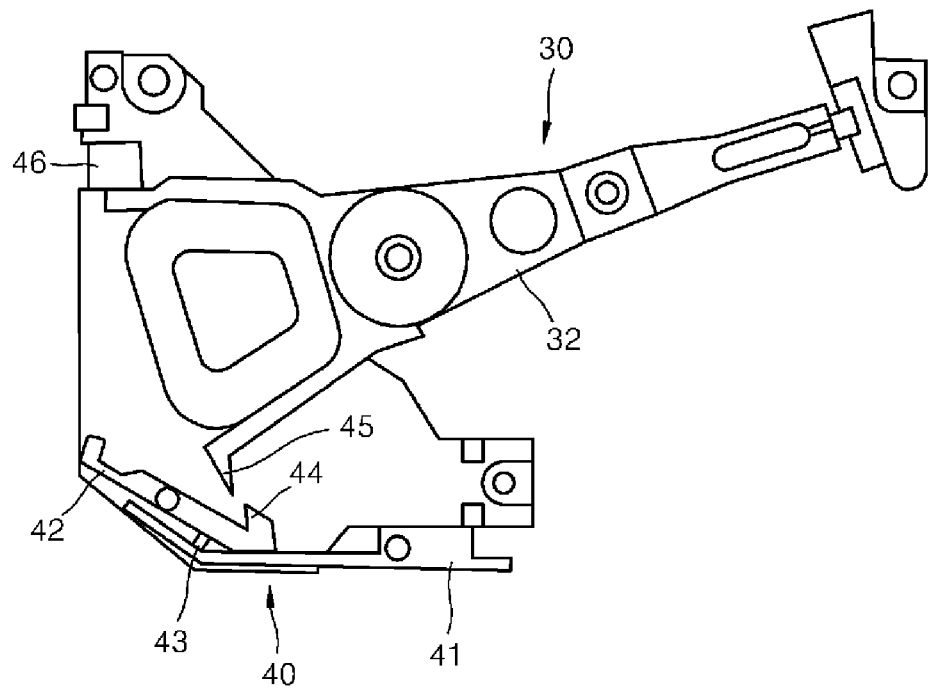
FIGS. 2A, 2B, and 2C are each a plan view of a conventional dual-lever inertial latch system of an HDD, and together illustrate the operation of the latch system.
Figure 2B:
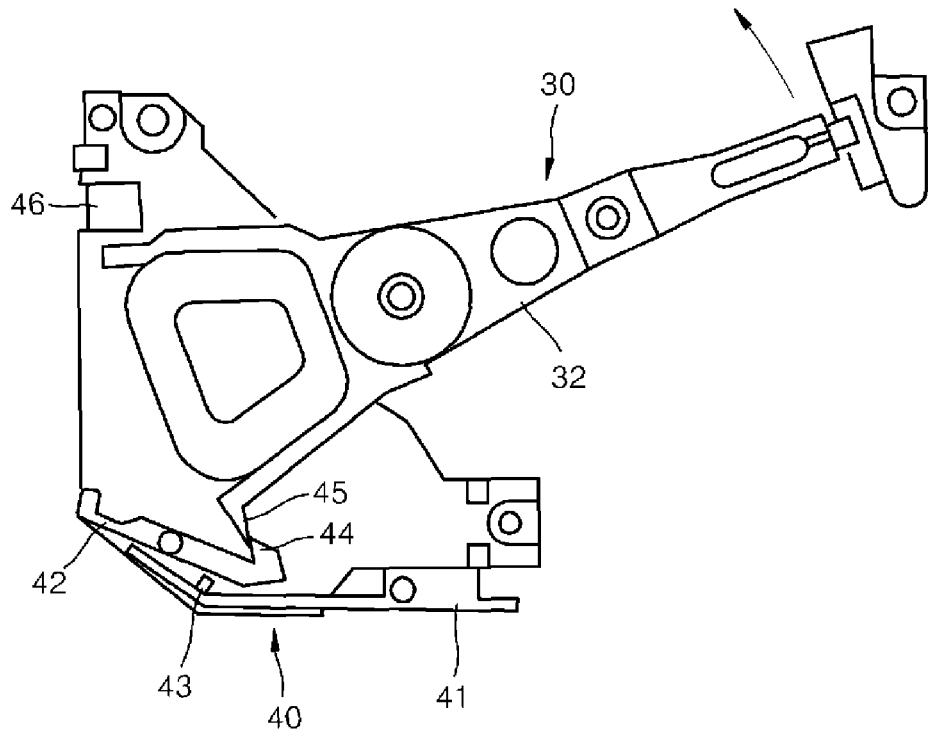
Figure 2C:
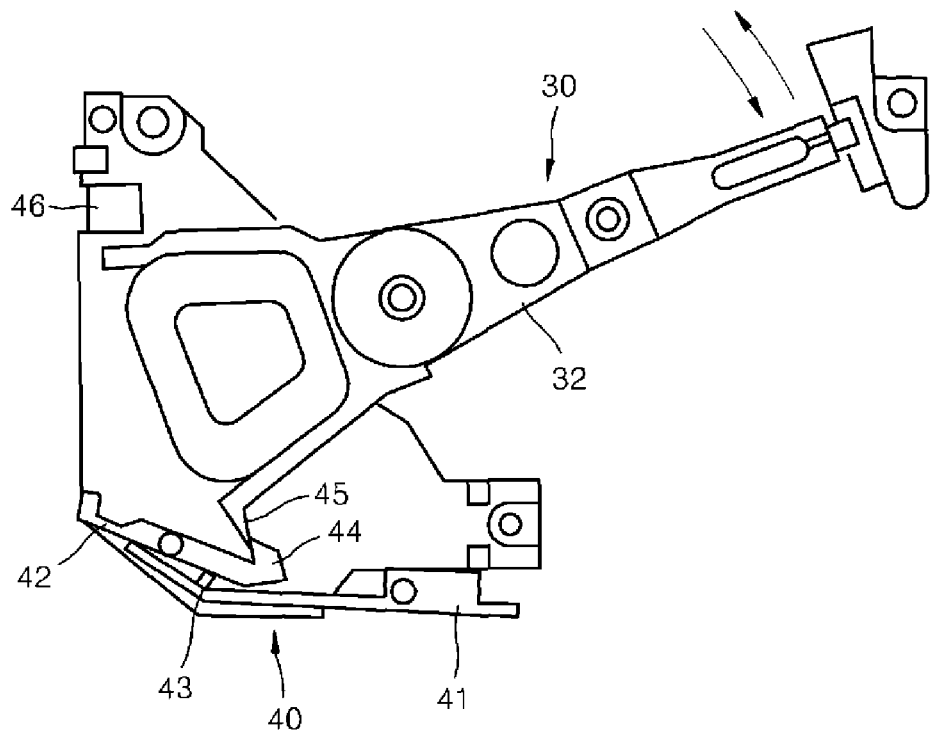
Figure 3:
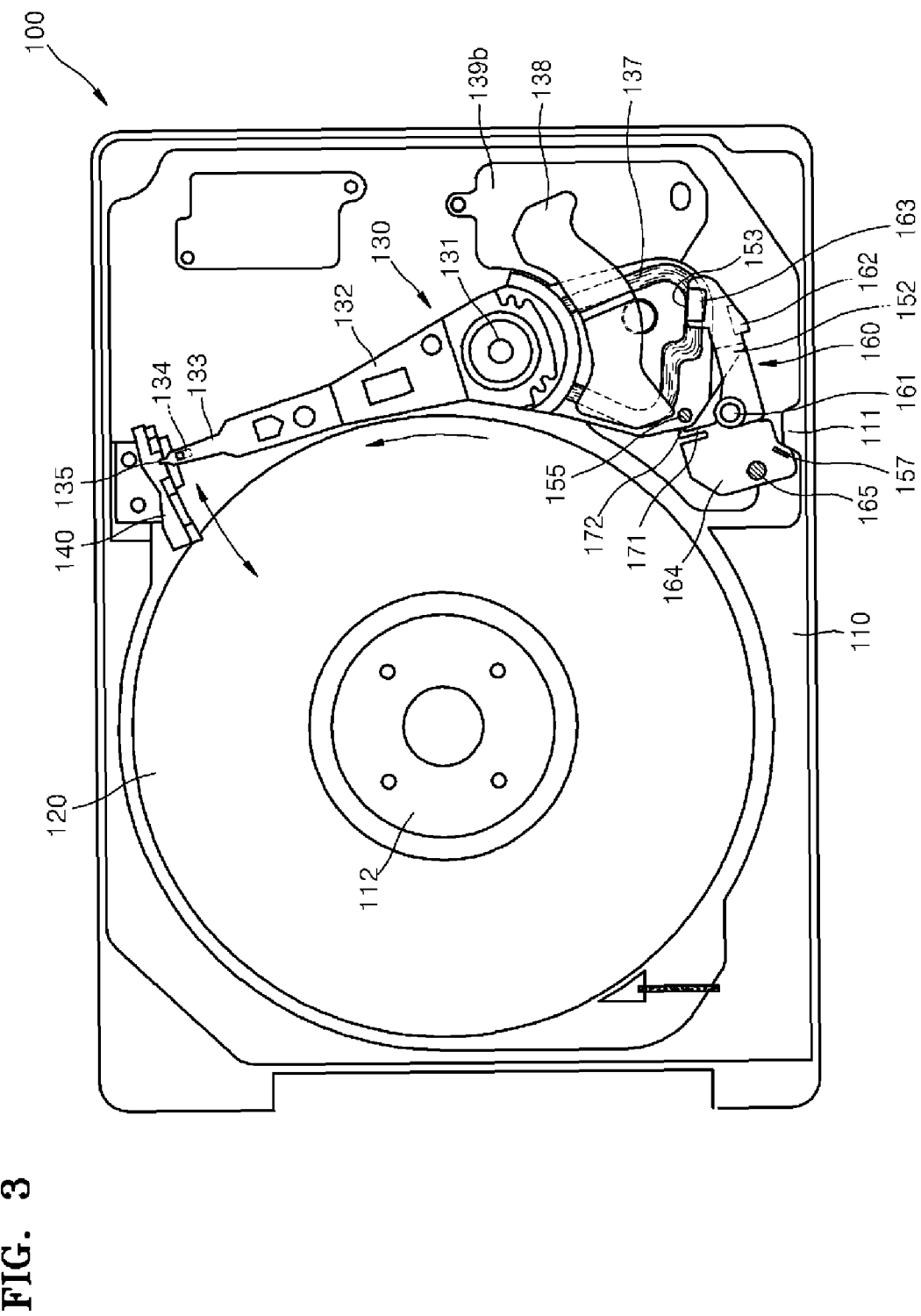
FIG. 3 is a plan view of an HDD including an actuator latch system according to the present invention.

A hard disk drive (HDD) according to the present invention will now be described more fully with reference to the accompanying drawings.

Referring to FIGS. 3, 4, and 5A through 5C, the HDD 100 includes a base 110, a spindle motor 112 mounted to the base 110, a disk 120 mounted to the spindle motor 112 so as to be rotated by the spindle motor 112, a magnetic head, and an actuator 130 that moves the magnetic head over the disk 120 to facilitate the recording/reproducing data onto/from the disk 120. The actuator 130 includes a pivot 131 disposed on the base 110, a swing arm 132 supported by the pivot 131 so as to be rotatable, a head slider 134 that contains the magnetic head, a suspension assembly 133 disposed on a front end portion of the swing arm 132 and which supports the head slider 134, and a voice coil motor (VCM) that rotates the swing arm 132 about the central longitudinal axis of the pivot 131. The elasticity of the suspension assembly 133 biases the magnetic head towards a surface of the disk 120 during a read/write operation in which data is being recorded onto or read from the surface of the disk.

The VCM includes a VCM coil 137 disposed on a rear end portion of the swing arm 132, and a magnet or magnets 138 disposed above and/or below the VCM coil 137 so as to face the VCM coil 137. However, a section 153 of the VCM coil 137 is laterally offset from the general form of the loop of the coil. Hence, this section 153 of the VCM coil will be referred to hereinafter as the "laterally offset section" of the VCM coil. This section 153 of the VCM coil also extends laterally of the magnet(s) 138 of the VCM. That is, the laterally offset section 153 of the VCM coil 137 is disposed radially outwardly of the magnet(s) 138 in a direction perpendicular to the axis of rotation of the swing arm 132. In this respect, in the embodiment shown in FIG. 4, the laterally offset section 153 of the VCM coil 137 is not disposed under the magnet 138.

The magnet(s) 138 is/are attached to yokes 139a, 139b which are, in turn, fixed to the base 110. The VCM is controlled by a servo control system that controls the supply of current to the VCM coil 137, and rotates the swing arm 132 in a direction according to Fleming's left-hand rule due to an interaction between the electric current flowing through the VCM coil 137 and the magnetic field formed by the magnets 138. In particular, when the HDD 100 is turned on and the disk 120 starts rotating, the VCM rotates the swing arm 132 counter-clockwise to move the magnetic head onto a recording surface of the disk 120. On the other hand, when the HDD 100 is turned off and the disk 120 stops rotating, the VCM rotates the swing arm 132 clockwise so that the magnetic head is moved off of the recording surface of the disk 120 and is parked. More specifically, when the disk 120 stops rotating, the swing arm 132 is rotated clockwise by the VCM, and an end-tab 135 of the suspension assembly 133 is slid up and onto the ramp 140 where it remains to thereby park the magnetic head.

The HDD 100 also includes an actuator latch system. The actuator latch system retains the actuator 130 when the magnetic head 140 is parked. That is, the actuator latch system prevents external shock or vibrations from rotating the swing arm 132 when the HDD 100 is not in use, i.e., when the magnetic head is parked. In particular, the actuator latch system prevents the magnetic head from being moved into contact with the recording surface of the disk 120 which situation could otherwise result in the recording surface and/or the magnetic head being damaged.

The actuator latch system includes a member defining a notch 152 at a rear end portion of the swing arm 132, and a latch lever 160 rotatably supported on the base 110 by a pivot 161. The rear end portion of the swing arm 132 is generally formed of an injection-molded plastic such that the member defining the notch 152 is easily formed unitarily with the swing arm 132 during the injection molding process.

The latch lever 160 has a hook 162 at a front end portion thereof and a counterbalance 164 at a rear end portion. In particular, the hook 162 may protrude downward at the front end portion of the latch lever 160 to face the notch 152. The hook 162 is received within the notch 152 when the swing arm 132 of the actuator 130 is locked in place. Also, at this time, the front end portion of the latch lever 160 extends over the laterally offset section 153 of the VCM coil 137. In the case in which a magnet 138 is disposed below the VCM coil 137, the front end portion of the latch lever 160 may instead extend below the laterally offset section 153 of the VCM coil 137.

Figure 5A:
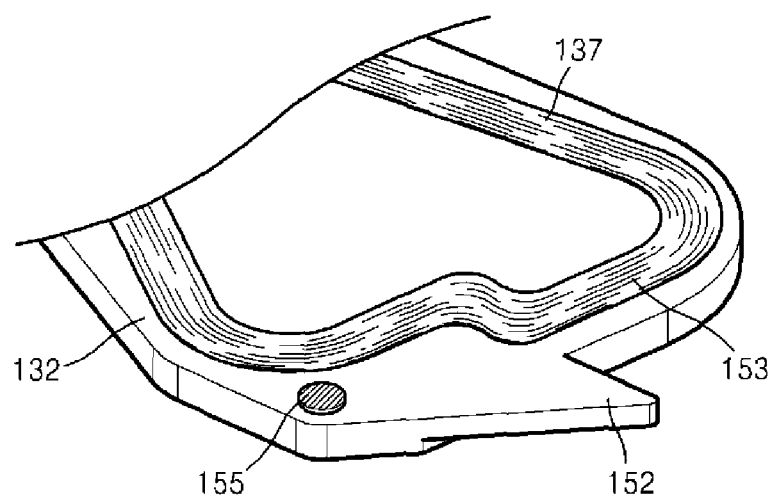
FIG. 5A is a perspective view of the rear end portion of the swing arm of the HDD shown in FIG. 3
Figure 5B:
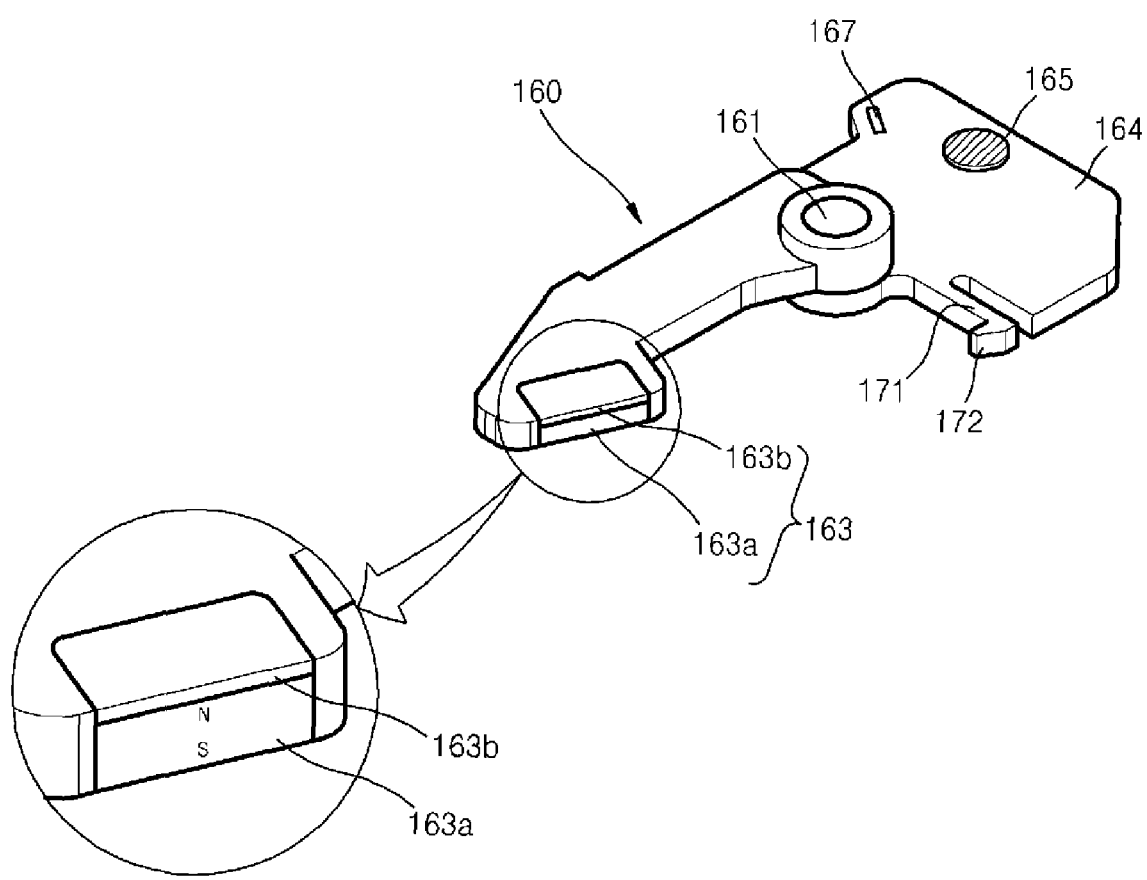
FIG. 5B is a perspective view of the latch lever of the actuator latch system of the HDD shown in FIG. 3, and includes an enlarged view of a magnetic body of the latch lever.
Figure 5C:
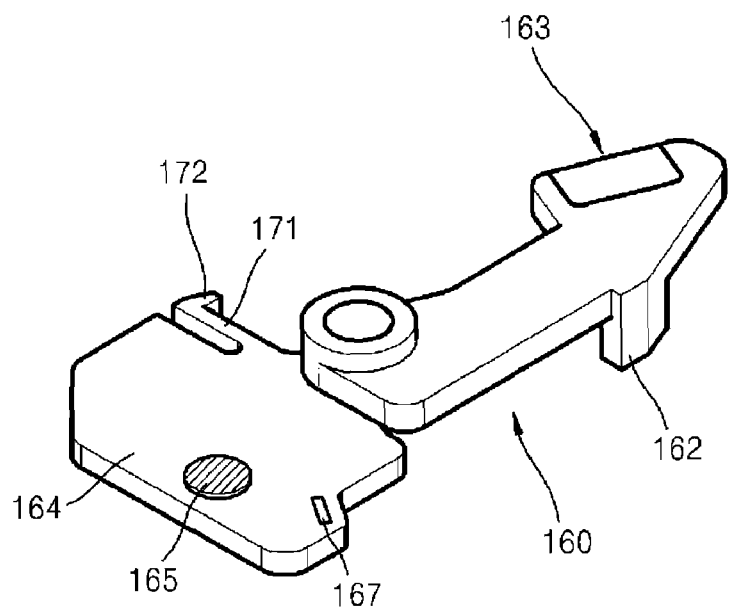
FIG. 5C is a perspective view of the latch lever from another angle.

In addition, the latch lever 160 includes a magnetic member 163 at the front end portion thereof. As illustrated in FIG. 5B, the magnetic member 163 includes a permanent magnet 163a, and an iron member 163b attached to the top of the permanent magnet 163a so as to increase the magnetic flux density. Thus, the permanent magnet 163a is juxtaposed with the laterally offset section 153 of the VCM coil 137 in the direction of the axis of rotation of the swing arm, and faces the upper surface of the laterally offset section 153 of the VCM coil 137 when the hook 162 is received within the notch 152 and the swing arm 132 of the actuator 130 is thereby locked in place while the magnetic head is parked. Alternatively, in the case described above in which a magnet 138 is disposed below the VCM coil 137, the magnetic member 163 may face towards the lower surface of the laterally offset section 153 of the VCM coil 137, and the hook 162 may protrude upwards at the front end portion of the latch lever 160.

In either case, the hook 162 of the latch lever 160 engages the swing arm 132 within the notch 152 to prevent the swing arm 132 from rotating when an external shock is applied to the hard disk drive 100 while the magnetic head is parked. On the other hand, the magnetic member 163 and the laterally offset section 153 of the VCM coil 137 co-act to rotate the latch lever 160 clockwise during a normal operation of the hard disk drive 100, to thereby prevent the hook 162 of the latch lever 160 from arresting the counter-clockwise rotation of the swing arm 132. The various ways in which the actuator latch system functions will be described in more detail below.

The rotation of the swing arm 132 in the clockwise direction due to inertia, when a shock is applied to the HDD while the magnetic head is parked, is restricted by the counterbalance 164. More specifically, the counterbalance 164 collides with a side of the rear end of the swing arm 132 as the swing arm rotates clockwise to prevent the swing arm 132 from rotating further in the clockwise direction. The counterbalance 164 may include a buffering arm 171 for buffering the shock generated when the counterbalance 164 and the swing arm 132 collide. To this end, the buffering arm 171 is preferably formed of an elastic material, for example, a plastic material such as polyimide. Also, the buffering arm 171 may have a protrusion 172 that projects toward the side of the rear end of the swing arm 132. The protrusion 172 reduces the area of contact between the buffering arm 171 and the swing arm 132 in order to minimize the amount of particles that are produced when the buffering arm 171 and the swing arm 132 collide.

The latch system may also have a stopper 111 positioned on the base 110 to block the counterbalance 164. More specifically, the stopper 111 collides with the counterbalance 164 of the latch lever 160 when the latch lever 160 rotates counter-clockwise due to inertia. Thus, the stopper 111 limits the rotation of the latch lever 160 in the counter-clockwise direction. In addition, the counterbalance 164 may have a hole 167 extending therein in the direction of the thickness of the latch lever 160. The hole 167 helps the counterbalance 164 absorb shock when the counterbalance 164 collides with the stopper 111 and thus, prevents the latch lever 160 from being damaged and helps to minimize noise.

Furthermore, the latch system may also have a first core 155 and a second core 165 disposed, respectively, in the swing arm 132 and the latch lever 160. The first core 155 is disposed in a corner of the rear end portion of the swing arm 132. The first core 155 may be a (ferro)magnetic body, for example, an iron or steel body, so that a magnetic force of attraction is generated between the first core 155 and the magnet(s) 138. Therefore, the first core 155 applies torque to the swing arm 132 in the clockwise direction. The torque prevents the actuator 130 from being moved by weak shocks and vibrations.

The second core 165 may be also formed of a (ferro)magnetic body, for example, a steel body, so that a magnetic force of attraction is generated between the second core 165 and the magnet(s) 138. However, the second iron core 165 is disposed further from the magnet(s) 138 than the first core 155 when the magnetic head of the actuator 130 is parked. At this time, an insignificant magnetic force acts between the second core 165 and the magnet(s) 138. However, when the hard disk drive 100 is turned on and the swing arm 132 of the actuator 130 is rotated counterclockwise, the latch lever 160 is rotated clockwise, and the distance between the second core 165 and the magnet 138 is reduced. Accordingly, the magnetic force of attraction between the second core 165 and the magnet 138 increases to such an extent that the latch lever 160 is rotated clockwise, i.e., the magnetic force of attraction between the second core 165 and the magnet 138 ensures that the swing arm 132 remains unlatched.

Figure 4:
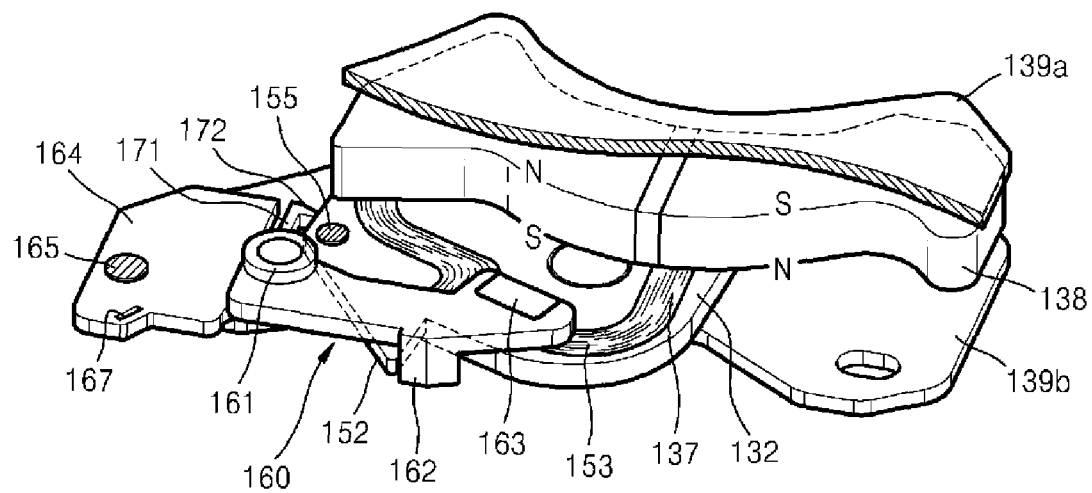
FIG. 4 is a perspective view of the actuator latch system of the HDD shown in FIG. 3.
Figure 6:
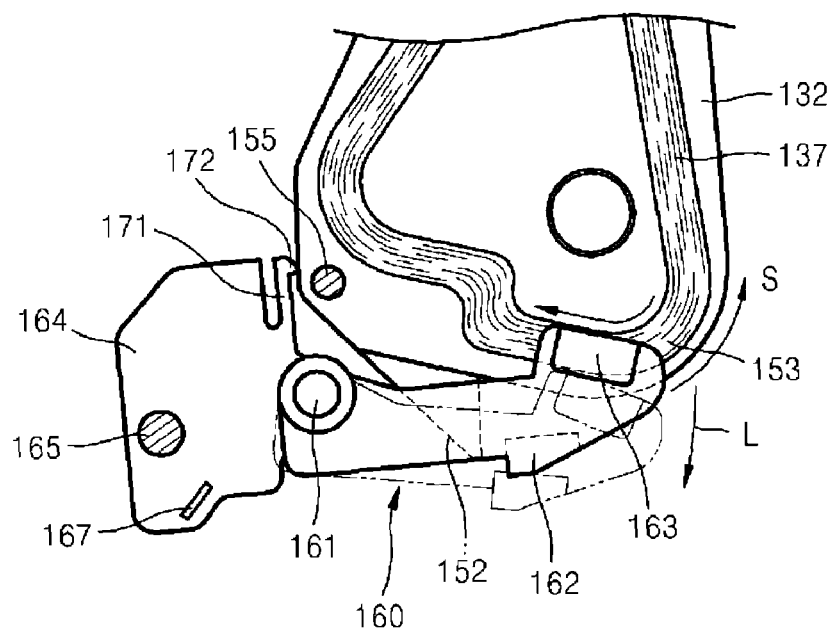
FIG. 6 is a plan view of the actuator latch system shown in FIG. 3.

The interaction between the laterally offset section 153 of the VCM coil 137 and the magnetic member 163 of the latch lever 160, which are characteristic components of the present invention, will now be described in more detail with reference to FIGS. 4 and 6.

When the hard disk drive 100 starts operating, current (i) is controlled to flow in a clockwise direction in the VCM coil 137. The current (i) flows through the VCM coil 137 within the magnetic field generated by the magnet 138. Accordingly, thrust is applied to the VCM coil 137. Because the magnet 138 has its poles oriented as illustrated in FIG. 4, the thrust is applied in the counterclockwise direction and therefore causes the swing arm 132 to rotate in the counterclockwise direction (denoted by arrow S). At the same time, thrust is applied to the laterally offset section 153 of the VCM coil 137 by the interaction between the current (i) and the magnetic field generated by the permanent magnet 163a of the magnetic member 163 disposed on the front end portion of the latch lever 160. The thrust applied to the laterally offset section 153 of the VCM coil 137 is directed towards the pivot 131 of the actuator, i.e., the thrust acts in a direction that substantially intersects the axis of rotation of the swing arm 132. Thus, there is no moment produced about the axis of rotation and hence, the swing arm 132 is not rotated due to this interaction. Rather, the front end portion of the latch lever 160, to which the magnetic member 163 is mounted, is rotated in the clockwise direction (denoted by arrow L). Thus, the swing arm 132 is unlatched, and the hook 162 of the latch lever 160 is prevented from re-engaging the swing arm 132. Therefore, the hard disk drive 100 will operate properly and reliably.

A locking operation and a release operation of the actuator latch system will now be described with reference to FIGS. 7 and 8.

Figure 7:
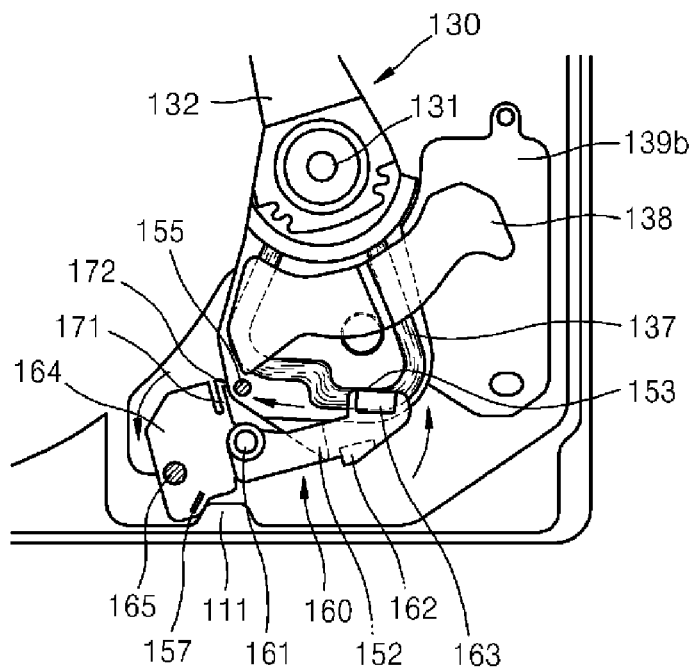
FIGS. 7 and 8 are each a plan view of a portion of the HDD shown in FIG. 3, and respectively illustrate a locking operation and a release operation of the actuator latch system.

First, referring to FIG. 7, when the operation of the hard disk drive 100 is terminated and the magnetic head in the slider 134 is parked on the ramp 140, the swing arm 132 is rotated clockwise around the pivot 131 by the VCM. At this time, the rear end portion of the swing arm 132 contacts the counterbalance 164 of the latch lever 160. Consequently, the latch lever 160 is pushed by the swing arm 132 so as to rotate counterclockwise about the latch pivot 161. As a result, the counterbalance 164 of the latch lever 160 contacts the stopper 111, whereupon the counterclockwise rotation of the latch lever 160 is arrested.

Thus, the magnetic head is parked on the ramp 140, and the swing arm 132 is locked in place by the clockwise torque that is applied to the swing arm 132 by the first core 155 and the magnet 138. As mentioned above, at this time, the second core 165 in the counterbalance 164 of the latch lever 160 is spaced from the magnet 138 by such a large distance that the interaction between the second core 165 and the magnet 138 has little effect on the latch lever 160.

Meanwhile, the hard disk drive 100 can experience shocks when the magnetic head is parked. If the shock is larger than the torque exerted on the swing arm 132 by the first iron core 155 and the magnet 138, the swing arm 132 can begin to rotate counterclockwise due to inertia. However, in this case, the hook 162 of the latch lever 160 enters the notch 152 in the rear end portion of the swing arm 132 and thus, rotation of the swing arm 132 in the counterclockwise direction is arrested before the magnetic head contacts the disk.

On the other hand, shock applied to the hard disk drive 100 may act in a direction that urges the swing arm 132 to rotate clockwise. However, in this case, the swing arm 132 does not rotate clockwise because the rear end portion of the swing arm 132 and the counterbalance 164 of the latch lever 160 are in contact. Rather, the rear end portion of the swing arm 132 rebounds from the counterbalance 164 and the swing arm 132 thus begins to rotate counterclockwise. As described above, the counterclockwise rotation of the swing arm 132 is arrested by the hook 162 of the latch lever 160.

Figure 8:
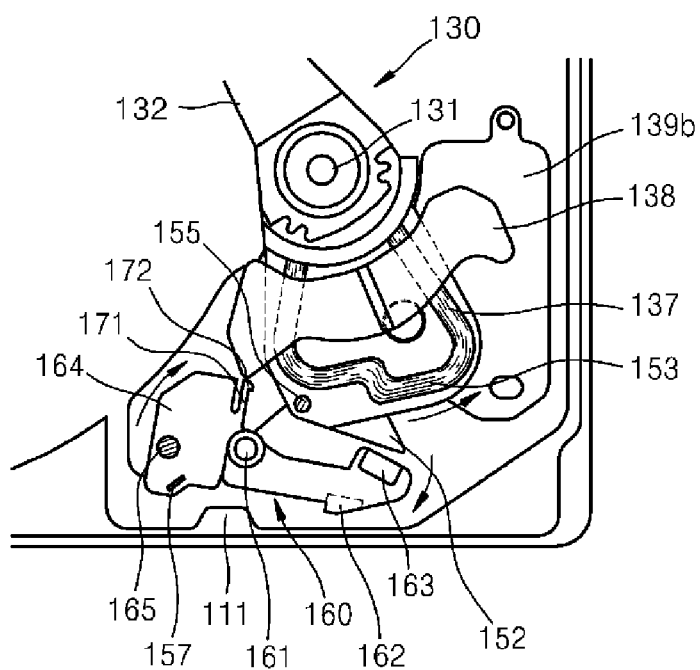

Next, referring to FIG. 8, a read/write operation is initiated by controlling the current to flow clockwise through the VCM coil 137. The resulting thrust on the VCM coil 137 is sufficient to overcome the clockwise torque that is applied to the swing arm 132 by the interaction between first core 155 and the magnet 138. As a result, the swing arm 132 begins to rotate counterclockwise. At the same time, as described above, the latch lever 160 is rotated clockwise by the interaction between the laterally offset section 153 of the VCM coil 137 and the magnetic member 163 of the latch lever 160. Accordingly, the hook 162 of the latch lever 160 does not interfere with the counterclockwise rotation of the swing arm 132 and thus, the hard disk drive 100 will operate normally and reliably. Also, as the latch lever 160 rotates clockwise, the distance between the second iron core 165 and the magnet 138 is reduced. Thus, a magnetic force is applied between the second core 165 and the magnet 138. Thus, the latch lever 160 is kept away from the swing arm 132, i.e., the unlatched state of the swing arm 132 is maintained by the magnetic force between the second core 165 and the magnet 138.

Finally, although the present invention has been described in connection with the preferred embodiments thereof, it is to be understood that the scope of the present invention is not so limited. On the contrary, various modifications of and changes to the preferred embodiments will be apparent to those of ordinary skill in the art. Thus, changes to and modifications of the preferred embodiments may fall within the true spirit and scope of the invention as defined by the appended claims.

What is claimed is:

1. A hard disk drive (HDD) comprising:
a base;
a swing arm supported on the base so as to be rotatable about an axis of rotation, the swing arm defining a notch at a rear end portion of the swing arm;
a magnetic head supported by the swing arm at a front end portion of the swing arm, wherein the swing arm is rotatable between a parked position at which the magnetic head is parked, and an operating position at which the magnetic head is positioned so as to carry out a read/write operation;
a voice coil motor (VCM) coil extending along a rear end portion of the swing arm;
at least one magnet supported on the base and juxtaposed with the VCM coil in the direction of the axis of rotation of the swing arm; and
a latch lever disposed adjacent the rear end portion of the swing arm, the latch lever being mounted to the base so as to be rotatable about an axis of rotation, and the latch lever including a hook at a front end portion of the latch lever, and a magnet disposed on the front end portion of the latch lever, the hook of the latch lever and the notch in the rear end of the swing arm being positioned relative to each other such that the latch lever is rotatable about its axis of rotation between a latched position at which the hook of the latch lever is located within the notch in the rear end portion of the swing arm when the swing arm is in its parked position so as to arrest rotation of the swing arm in one direction about the axis of rotation of the swing arm while the magnetic head is parked, and an unlatched position at which the hook will not interfere with the swing arm during its rotation in said one direction, and the magnet of the latch lever facing a section of the VCM coil when the swing arm is in its parked position and the latch lever is in its latched position, whereby when the hard disk drive is started, the latch lever is rotated about its axis of rotation by a force exerted thereon due to an interaction between the magnetic field generated by the magnet of the latch lever and current flowing through the section of the VCM coil faced by the magnet of the latch lever.

2. The HDD of claim 1, wherein the section VCM coil that is faced by the magnet of the latch lever, when the swing arm is in its parked position and the latch lever is in its latched position, is a laterally offset section of the coil so as to be disposed radially outwardly of said at least one magnet in a direction perpendicular to the axis of rotation of the swing arm.

3. The HDD of claim 1, wherein the magnet of the latch lever is a permanent magnet, and the latch lever also has an iron member lying along a surface of the permanent magnet.

4. The HDD of claim 3, wherein a surface of the permanent magnet faces said section of the VCM coil and is juxtaposed therewith in the direction of the axis of rotation of the swing arm, and the iron member lies along a surface of the permanent magnet which is opposite to the surface of the permanent magnet that faces said section of the VCM coil, when the swing arm is in its parked position and the latch lever is in its latched position.

5. The HDD of claim 1, wherein the front end portion of the latch lever extends over the rear end portion of the swing arm, and the magnet of the latch lever faces the top of said section of the VCM coil, when the swing arm is in its parked position and the latch lever is in its latched position.

6. The HDD of claim 5, wherein the hook protrudes downward at the front end portion of the latch lever.

7. The HDD of claim 1, wherein the latch lever also has a counterbalance at a rear end portion of the latch lever disposed on an opposite side of the axis of rotation of the latch lever from the hook, and a magnetic core mounted to the counterbalance.

8. The HDD of claim 7, wherein the magnetic core is positioned on the counterbalance so as to located closer to the at least one magnet when the latch lever is in its unlatched position than when the latch lever is in its latched position, whereby the at least one permanent magnet exerts a relatively strong magnetic force of attraction on the iron core when the latch lever is in its unlatched position.

9. The HDD of claim 1, wherein the section VCM coil that is faced by the magnet of the latch lever, and the poles of the magnet of the latch lever are oriented relative to each other such a thrust generated on the swing arm due to said interaction between the magnetic field and current flowing through the VCM coil acts on the swing arm in a direction that substantially intersects the axis of rotation of the swing arm.

10. In a hard disk drive (HDD) having a swing arm rotatable about an axis of rotation and carrying a magnetic head at a front portion thereof and a voice coil motor (VCM) coil at a rear end portion thereof, and an actuator latch system including a hook at a front end portion of the latch lever and a notch in the rear end portion of the swing arm, the hook of the latch lever cooperating with the notch to selectively lock in place and release the swing arm, wherein the improvement comprises:

the latch lever having a magnet disposed on the front end portion thereof, and the VCM coil having a section extending alongside the magnet when the latch lever is in a position locking the swing arm in place, whereby when the latch lever is in said position locking the swing arm in place and current is supplied to the VCM coil, a force is exerted on the latch lever due to an interaction between the magnetic field generated by the magnet of the latch lever and the current flowing through said section of the VCM coil.

11. The improvement in the HDD of claim 10, wherein said section of VCM coil is a laterally offset section of the coil.

12. The improvement in the HDD of claim 10, wherein the magnet of the latch lever of the actuator latch system is a permanent magnet, and the latch lever also has an iron member lying along a surface of the permanent magnet.

13. The improvement in the HDD of claim 12, wherein a surface of the permanent magnet faces said section of the VCM coil and is juxtaposed therewith in the direction of the axis of rotation of the swing arm, and the iron member lies along a surface of the permanent magnet which is opposite to the surface of the permanent magnet that faces said section of the VCM coil, when the latch lever is in said position locking the swing arm in place.

14. The improvement in the HDD of claim 10, wherein the front end portion of the latch lever of the actuator latch system extends over the rear end portion of the swing arm, and the magnet of the latch lever faces the top of said section of the VCM coil, when the latch lever is in said position locking the swing arm in place.

15. The improvement in the HDD of claim 14, wherein the hook protrudes downward at the front end portion of the latch lever.

16. The improvement in the HDD of claim 10, wherein the section VCM coil that extends alongside the magnet on the front end portion of the latch lever of the actuator latch system, and the poles of the magnet on the front end portion of the latch lever are oriented such a thrust generated on the swing arm due to said interaction, between the magnetic field and current flowing through the VCM coil, acts on the swing arm in a direction that substantially intersects the axis of rotation of the swing arm.

* * * * *